June 9, 1931.  H. M. HESSENBRUCH  1,809,698
LAWN MOWER FRAME
Filed Jan. 7, 1929
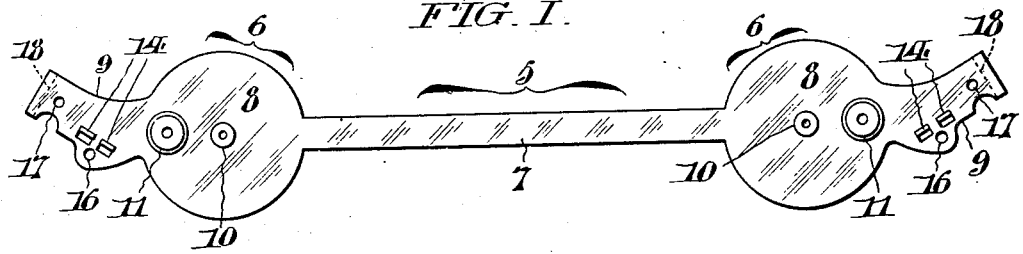
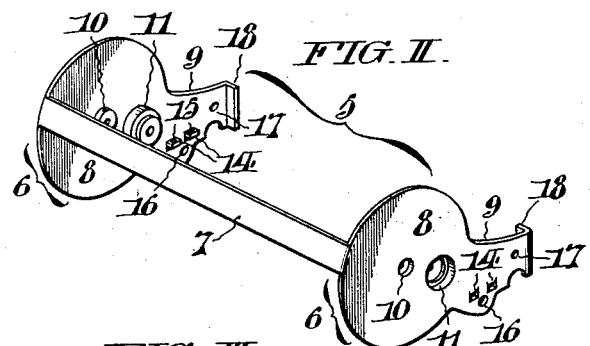
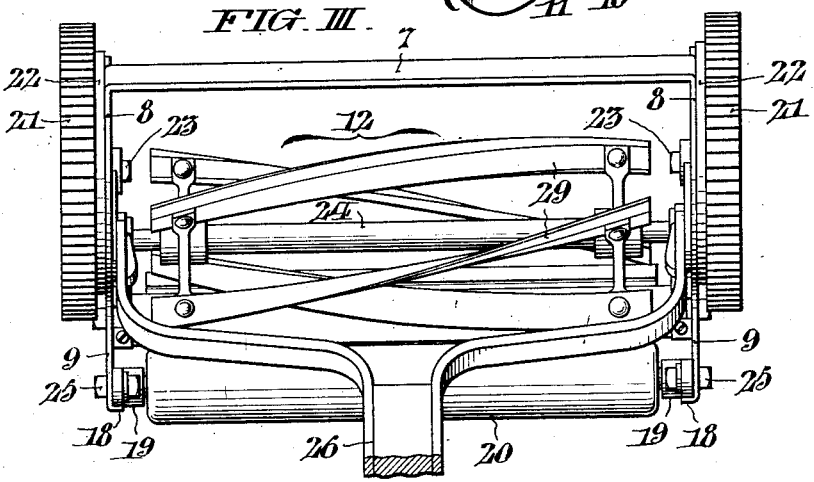
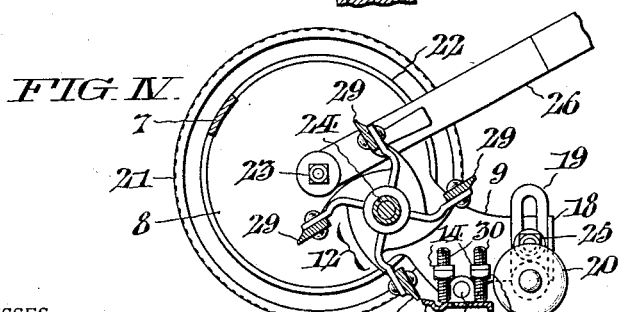
INVENTOR:
Hermann M. Hessenbruch
BY Fraley Paul
ATTORNEYS.

Patented June 9, 1931

1,809,698

UNITED STATES PATENT OFFICE

HERMANN M. HESSENBRUCH, OF WYNNEWOOD, PENNSYLVANIA, ASSIGNOR TO PHILADELPHIA LAWN MOWER COMPANY INC., OF PHILADELPHIA, PENNSYLVANIA, A CORPORATION OF PENNSYLVANIA

LAWN MOWER FRAME

Application filed January 7, 1929. Serial No. 330,768.

This invention relates to mowing machines and more particularly to the type comprising symmetrical side plates connected together in parallel relation to form a frame housing for the cutting and operating mechanism.

The primary object of my present improvements is to provide a one-piece sheet metal frame for lawn mowers comprising counterpart side components, with an integrally formed connecting girth; said side components embodying symmetrical bearings, perforations and abutments.

Another object is to provide an integrally formed sheet metal frame of the type referred to, which is economical to produce, of serviceable character, and very efficient in use.

With the foregoing and other objects in view which will appear as the following description proceeds, this invention consists of the novel features hereinafter described in detail, illustrated by the accompanying sheet of drawings, and more specifically pointed out in the subjoined claims.

In the drawings:

Fig. I is a plan view of my novel lawn mower frame unit as initially stamped from sheet metal.

Fig. II is a perspective view of the same after those portions designed to constitute the side plates of the machine have been bent into parallelism.

Fig. III is a top plan view of a standard type of lawn mower including my novel form of one-piece frame; and, Fig. IV is a transverse sectional view of the same.

Referring more in detail to these illustrations, and firstly to Figs. I and II thereof, my novel one-piece frame is comprehensively designated by the numeral 5, the same being conveniently stamped out of sheet steel to embody counterpart cheeks or side plates 6, connected by a girth or brace bar 7. As these side plates 6 are symmetrical in all respects, other than being counterpart or right and left hand components, the following description will be restricted to a detailed explanation of one of said components in order to avoid repetitive explanatory matter.

Each cheek or side plate 6, it will be observed, comprises a substantially circular portion 8 with a co-planar irregularly-configured extension 9; and, during the course of its production, said portion 8 is formed with an apertured concentric embossment 10 and a corresponding eccentric embossment 11. The latter of these embossments —11—affords, as later on explained, bearing for one end of the rotary cutting-reel 12 (Figs. III and IV) of the lawn mower, and the former 10 constitutes a bearing for one of the ground wheels 21; whereas both jointly function as journals for the drive mechanism, not shown.

In addition, each cheek or side plate extension 9 is provided with a pair of lateral inwardly-directed ears or abutments 14, stamped out therefrom and apertured at 15, for a purpose later on fully set forth. The extension 9 is also pierced by holes 16, 17 for purposes hereinafter mentioned; while the terminal thereof is angled or bent to provide a rigid rib or guide flange 18 for the slotted supporting element 19 of the back roller 20.

After stamping or otherwise forming the blank to embody the described characteristic features the cheeks or side plates 6 are appropriately brought into parallelism; or, in other words, said side plates are bent along the terminal portions of the girth or brace bar 7 so as to occupy planes at right angles thereto, as best appreciated from Figs. II and III.

The one-piece frame 5 thus produced is assembled in the lawn mower along conventional lines, but in order to better appreciate its adaptation thereto, reference will now be had to Figs. III and IV, wherein like characters designate those parts hereinbefore explained. In these views the numeral 21 designates the ground or supporting wheels with integrally formed gear housings 22, said wheels being journaled by axles 23 in the concentric embossment bearings 10. The rotary cutting reel 12 is journaled by its shaft 24 in the eccentric embossment bearings 11; while the clamp bolts 25 that secure the back roller 20 at the requisite vertical adjustment are passed through the holes 17, whereby the slotted supporting elements 19 are butted against the frame guide flanges or ribs 18 and prevented from vibration when the lawn mower is in use. 26 is a broken portion of the usual handle.

The stationary knife 27 is rockably supported by suitable pivots 28 afforded bearing in the holes 16 of the frame cheek extensions 9, and it is adjustable in an upward or downward direction, relative to the blades 29 of the rotary cutting-reel 12, through the medium of stop screws 30 afforded guidance in the non-tapped apertures 15 of the abutments 14. Beneath these abutments each stop screw 30 accommodates a threadedly engaging nut 31 which is restrained against rotation by contact of one of its flat faces with the adjoining frame extension wall 9; while adjustment of the stationary knife is effected by application of a screw-driver, or other appropriate implement, to the upper ends of said screws, in an obvious manner.

From the foregoing it is thought my invention will be clearly understood, but it is to be noted that formation of the cheeks or side plates 6 as integral components of the girth or brace bar 7, not only considerably reduces the production costs involved; but that said girth or brace bar dispenses with employment of the customary tie rod or rods, while also serving as an effective guard to protect the blades 29, of the rotary cutting reel 12, when trailing the lawn mower.

Finally, I reserve the right to make such detail or other departures from the specific disclosure, as are necessary to adapt my novel lawn mower frame to differing types of mowing machines, and as warranted by reasonable interpretation accorded the subjoined claims.

Having thus described my invention, what I claim is:—

1. A lawn mower frame comprising symmetrical paralleling side members united by an integrally formed brace component, each said side member being symmetrically-configured and having an inwardly-angled terminal extension.

2. A lawn mower frame comprising symmetrical paralleling side members united by an integrally formed brace component, each side member embodying a substantially circular section with a co-planar irregularly-configured extension.

3. A lawn mower frame comprising symmetrical paralleling side members united by an integrally formed brace component, each side member embodying a substantially circular section with a co-planar irregularly-configured extension having the terminal ends laterally-angled as guide elements.

4. A lawn mower frame comprising symmetrical paralleling side members united by an integrally formed brace component, each side member embodying a substantially circular section with a co-planar irregularly-configured extension having the terminal ends inwardly-angled, and opposing concentric and eccentric bearing embossments in the circular sections.

5. A lawn mower frame comprising symmetrical paralleling side members united by an integrally formed brace component, each side member embodying a substantially circular section with a co-planar irregularly-configured extension having the terminal ends inwardly-angled, and opposing concentric and eccentric bearing embossments in the circular sections, with lateral apertured abutments in the extensions aforesaid.

6. A lawn mower frame comprising symmetrical paralleling side members united by an integrally formed brace component, each side member embodying a substantially circular section with a co-planar irregularly-configured extension having the terminal ends inwardly-angled, a concentric and an eccentric bearing embossment in each circular section, and lateral apertured abutments and opposing perforations in the extensions aforesaid.

In testimony whereof, I have hereunto signed my name at Philadelphia, Pennsylvania, this 19th day of December, 1928.

HERMANN M. HESSENBRUCH.